(12) United States Patent
Pourcheresse

(10) Patent No.: US 11,907,958 B2
(45) Date of Patent: Feb. 20, 2024

(54) REFRIGERATION UNIT USAGE DIAGNOSTIC AND EVALUATION

(71) Applicant: Carrier Corporation, Palm Beach Gardens, FL (US)

(72) Inventor: Lionel Pourcheresse, Le Mesnil Esnard (FR)

(73) Assignee: CARRIER CORPORATION, Palm Beach Gardens, FL (US)

(*) Notice: Subject to any disclaimer, the term of this patent is extended or adjusted under 35 U.S.C. 154(b) by 959 days.

(21) Appl. No.: 16/747,752

(22) Filed: Jan. 21, 2020

(65) Prior Publication Data

US 2020/0265441 A1    Aug. 20, 2020

(30) Foreign Application Priority Data

Feb. 18, 2019    (EP) .................................... 19305194

(51) Int. Cl.
| | | |
|---|---|---|
| F25D 11/00 | (2006.01) | |
| G06Q 30/01 | (2023.01) | |
| G06F 17/40 | (2006.01) | |
| G06Q 50/30 | (2012.01) | |
| B60P 3/20 | (2006.01) | |

(52) U.S. Cl.
CPC ............. *G06Q 30/01* (2013.01); *G06F 17/40* (2013.01); *G06Q 50/30* (2013.01); *B60P 3/20* (2013.01); *F25D 11/003* (2013.01); *F25D 2700/00* (2013.01)

(58) Field of Classification Search
CPC .. G06Q 30/016; G06Q 30/01; G06Q 10/0832; B60P 3/20
See application file for complete search history.

(56) References Cited

U.S. PATENT DOCUMENTS

| | | | | |
|---|---|---|---|---|
| 9,326,307 | B2* | 4/2016 | Erickson | G06F 8/65 |
| 9,451,031 | B2* | 9/2016 | Graziano | G05D 23/1931 |
| 10,503,162 | B2* | 12/2019 | Dinu | G05B 23/0291 |
| 10,655,895 | B2* | 5/2020 | Haack | F25B 41/20 |
| 10,755,210 | B2* | 8/2020 | Curran | B08B 9/0325 |
| 2012/0252488 | A1* | 10/2012 | Hartmann | G06Q 10/08 |
| | | | | 455/456.1 |

(Continued)

FOREIGN PATENT DOCUMENTS

WO    2017165518 A1    9/2017

OTHER PUBLICATIONS

EP Office Action; dated Feb. 17, 2022; EP Application No. 19305194.3; Filed: Feb. 18, 2019; 8 pages.

(Continued)

*Primary Examiner* — Filip Zec
(74) *Attorney, Agent, or Firm* — CANTOR COLBURN LLP

(57) ABSTRACT

Methods and systems for evaluation and diagnostic for a customer product are provided. Aspects include receiving, by a processor, customer usage data associated with the customer product, obtaining customer data associated with a customer business operation, analyzing, by the processor, the customer usage data and the customer data to generate a usage score card associated with the customer product, and determining an action for the customer product based at least in part on the usage score card.

10 Claims, 5 Drawing Sheets

(56) References Cited

U.S. PATENT DOCUMENTS

2014/0250925 A1\* 9/2014 Prabowo .............. F25B 49/005
　　　　　　　　　　　　　　　　　　　　　　　62/62
2015/0363750 A1\* 12/2015 Svensson .............. G06Q 10/20
　　　　　　　　　　　　　　　　　　　　　　　702/34
2017/0109712 A1\* 4/2017 Bullock ................ G06Q 10/20

OTHER PUBLICATIONS

EP Search Report; dated May 16, 2019; EP Application No. 19305194.3; Filed: Feb. 18, 2019; 7 pages.

\* cited by examiner

REFRIGERATION UNIT USAGE DIAGNOSTIC AND EVALUATION

CROSS-REFERENCE TO RELATED APPLICATIONS

This application claims the benefit of European Patent Application number 19305194.3 filed Feb. 18, 2019, which is incorporated herein by reference in its entirety.

BACKGROUND

Exemplary embodiments pertain to the art of transport refrigeration units and more particularly to a diagnostic tool for refrigeration unit usage.

Transport refrigeration units (TRUs) are containers designed to carry perishable freight at a specific temperature or within a temperature range. TRUs can be equipped with a variety of refrigeration systems for maintaining a specific temperature within the cargo space or interior compartment. Typically, a diesel engine driven trailer refrigeration unit is utilized for keeping fresh, frozen foods and other goods during transport. However, problems exist with these TRUs that can be attributable to how the TRUs are operated by an owner of the TRU. In addition, customers might not be utilizing the TRU in the most efficient manner or may require upgrades or downgrades based the utilization and needs for the customer's operations.

BRIEF DESCRIPTION

According to one embodiment, a method is provided. The method includes receiving, by a processor, customer usage data associated with the customer product, obtaining customer data associated with a customer business operation, analyzing, by the processor, the customer usage data and the customer data to generate a usage score card associated with the customer product, and determining an action for the customer product based at least in part on the usage score card.

In addition to one or more of the features described above, or as an alternative, further embodiments of the method may include displaying, on a display, the action and the usage score card.

In addition to one or more of the features described above, or as an alternative, further embodiments of the method may include that the customer product comprises a refrigeration system.

In addition to one or more of the features described above, or as an alternative, further embodiments of the method may include that the customer data is obtained utilizing sensors associated with the customer product.

In addition to one or more of the features described above, or as an alternative, further embodiments of the method may include obtaining, by one or more sensors, environmental data associated with the customer product and that determining the action for the customer product is further based at least in part on the environmental data.

In addition to one or more of the features described above, or as an alternative, further embodiments of the method may include that the sensors comprise a thermostat for the refrigeration system.

In addition to one or more of the features described above, or as an alternative, further embodiments of the method may include that the customer usage data is obtained through a customer survey.

In addition to one or more of the features described above, or as an alternative, further embodiments of the method may include operating a component of the customer product to implement the action for the customer product.

In addition to one or more of the features described above, or as an alternative, further embodiments of the method may include that the action comprises a suggested maintenance action for the customer product.

In addition to one or more of the features described above, or as an alternative, further embodiments of the method may include that the action comprises at least one of a suggested customer product upgrade and a suggested customer product downgrade.

According to one embodiment, a system is provided. The system includes a processor communicatively coupled to a memory, the processor configured to perform receiving, by the processor, customer usage data associated with the customer product, obtaining customer data associated with a customer business operation, analyzing, by the processor, the customer usage data and the customer data to generate a usage score card associated with the customer product, and determining an action for the customer product based at least in part on the usage score card.

In addition to one or more of the features described above, or as an alternative, further embodiments of the system may include displaying, on a display, the usage score card.

In addition to one or more of the features described above, or as an alternative, further embodiments of the system may include that the customer product comprises a refrigeration system.

In addition to one or more of the features described above, or as an alternative, further embodiments of the system may include that the customer data is obtained utilizing sensors associated with the customer product.

In addition to one or more of the features described above, or as an alternative, further embodiments of the system may include that the sensors comprise a thermostat for the refrigeration system.

In addition to one or more of the features described above, or as an alternative, further embodiments of the system may include that the customer usage data is obtained through a customer survey.

In addition to one or more of the features described above, or as an alternative, further embodiments of the system may include operating a component of the customer product to implement the action for the customer product.

In addition to one or more of the features described above, or as an alternative, further embodiments of the system may include obtaining, by one or more sensors, environmental data associated with the customer product and that determining the action for the customer product is further based at least in part on the environmental data.

In addition to one or more of the features described above, or as an alternative, further embodiments of the system may include that the action comprises a suggested maintenance action for the customer product.

In addition to one or more of the features described above, or as an alternative, further embodiments of the system may include that the action comprises at least one of a suggested customer product upgrade and a suggested customer product downgrade.

BRIEF DESCRIPTION OF THE DRAWINGS

The following descriptions should not be considered limiting in any way. With reference to the accompanying drawings, like elements are numbered alike.

DETAILED DESCRIPTION

Turning now to an overview of technologies that are more specifically relevant to aspects of the disclosure, typically, after selling a product (e.g., refrigeration unit for road transportation applications) to a customer, a seller has no understanding of how the customer is utilizing the product. Improper utilization of the product by the customer can lead to reduced product performance and an increase in environmental impact for the product.

Turning now to an overview of the aspects of the disclosure, one or more embodiments of the disclosure address the above-described shortcomings of the prior art by providing a usage diagnostic and recommendation tool to assist customers for improving how the customer utilizing the equipment/product in order to improve performance as well as keeping the environmental impact under control.

Figure 1A:
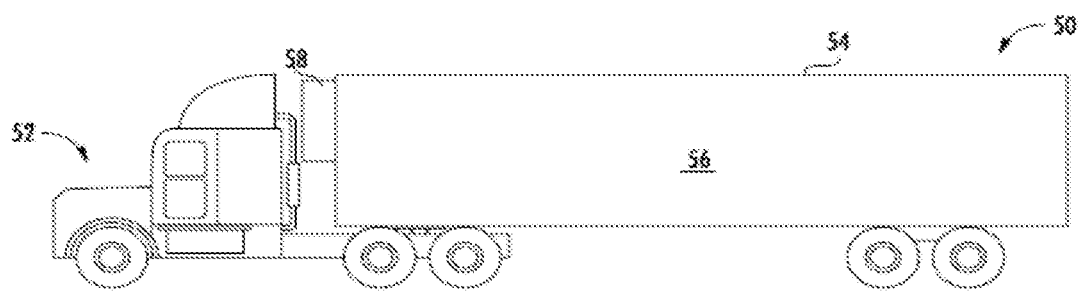
FIG. 1A depicts a transport refrigeration unit in an exemplary embodiment.

Turning now to a more detailed description of aspects of the present disclosure, FIG. 1A depicts a transport refrigeration system 50 having a refrigerated trailer. The trailer may be pulled by a tractor 52. The exemplary trailer includes a container 54 defining an interior compartment 56. It is understood that embodiments described herein may be applied to shipping containers that are shipped by rail or sea, without use of a tractor 52. An equipment housing 58 mounted to a front of the container 54 may contain a power supply. A refrigeration system may be electrically coupled to the power supply to receive electrical power. Refrigeration system includes a compressor, condenser, expansion valve and one or more evaporators defining a refrigeration circuit for circulating a refrigerant, as known in the art. Refrigeration system also includes one or more fans, such as a condenser fan, evaporator fan or ventilation fan.

Figure 1B:
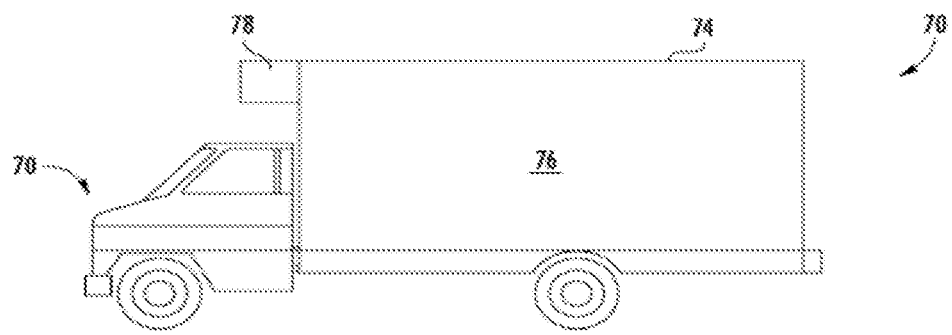
FIG. 1B depicts a transport refrigeration system as part of a truck according to one or more embodiment.

FIG. 1B depicts a transport refrigeration system as part of a truck according to one or more embodiments. The truck 70 can have an attached cargo box 74. The attached cargo box 74 defines an interior compartment 76. An equipment housing 78 can be mounted to a front of the cargo box 74 or to the top of the truck 70 in one or more embodiments. The equipment housing 78 can include a power supply and a refrigeration system electrically coupled to the power supply.

Figure 2:
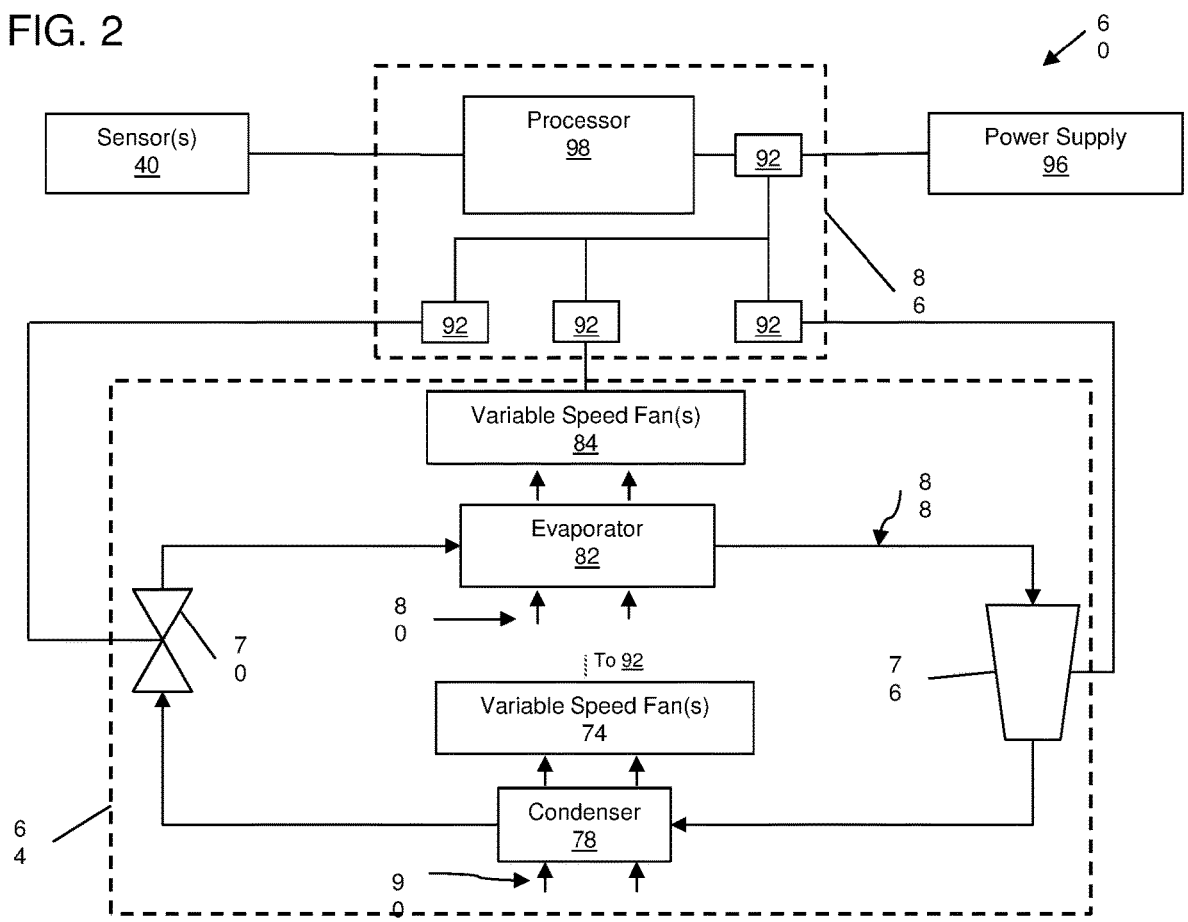
FIG. 2 depicts a diagrammatic illustration of an embodiment of a refrigeration unit.

A diagrammatic illustration of an embodiment of a refrigeration system 60 is shown in FIG. 2. The refrigeration system 60 includes a power supply 96, a refrigeration unit 64 configured with a compressor 78, a condenser 82, a refrigerant regulator 70, an evaporator 82, at fans 74, 84, and a control system 86 ("controller"). The refrigeration unit 64 is configured such that refrigerant travels through the compressor 76, the condenser 78, the refrigerant regulator 70 and the evaporator 82 in a closed loop path 88. The fan 84 has an alternating current ("ac") motor or a direct current ("dc") motor and is configured to condition air 80 from the interior compartment 56 in FIG. 1, and/or in some embodiments from outside the interior compartment 56 in FIG. 1, through the evaporator 82, and back into the interior compartment 56 in FIG. 1. The fan 74 has an alternating current ("ac") motor or a direct current ("dc") motor and is configured to move outside air 90, through the condenser 78, in order to reject heat out of the refrigeration system. In one or more embodiments, the power supply 96 can include a diesel engine, a diesel generator, a battery supply, and/or a mains power supply.

The controller 86 includes a processor 98 that is adapted to receive one or more feedback signals from one or more sensors 40, positioned within the interior compartment and/or the refrigeration unit 64, indicative of an environmental parameter (e.g., temperature, pressure, humidity, etc.) within the interior compartment, and/or feedback signals indicative of operating parameters of the refrigeration unit 64. The environmental parameter can also be collected from the ambient environment around the power supply 96 which can be within the interior compartment and/or outside the interior compartment. The processor 98 is further adapted to selectively maintain or change the operating mode of the refrigeration unit 64, using actuators 92 (e.g., switches, valves, etc.) in communication with the refrigeration unit 64 based on the feedback signals, an algorithm, or some combination thereof. For example, a temperature value sensed within the interior compartment may prompt the controller 86 to engage a non-operating refrigeration unit 64 to supply cooling air to the interior compartment, or it may prompt the controller 86 to disengage an operating refrigeration unit 64. Similarly, an operating parameter value associated with the refrigeration unit 64 may prompt the controller 86 to engage a dormant refrigeration unit 64, or to disengage an operating refrigeration unit 64. It should be noted that the functionality of the processor 98 may be implemented using hardware, software, firmware, or a combination thereof.

Figure 3:
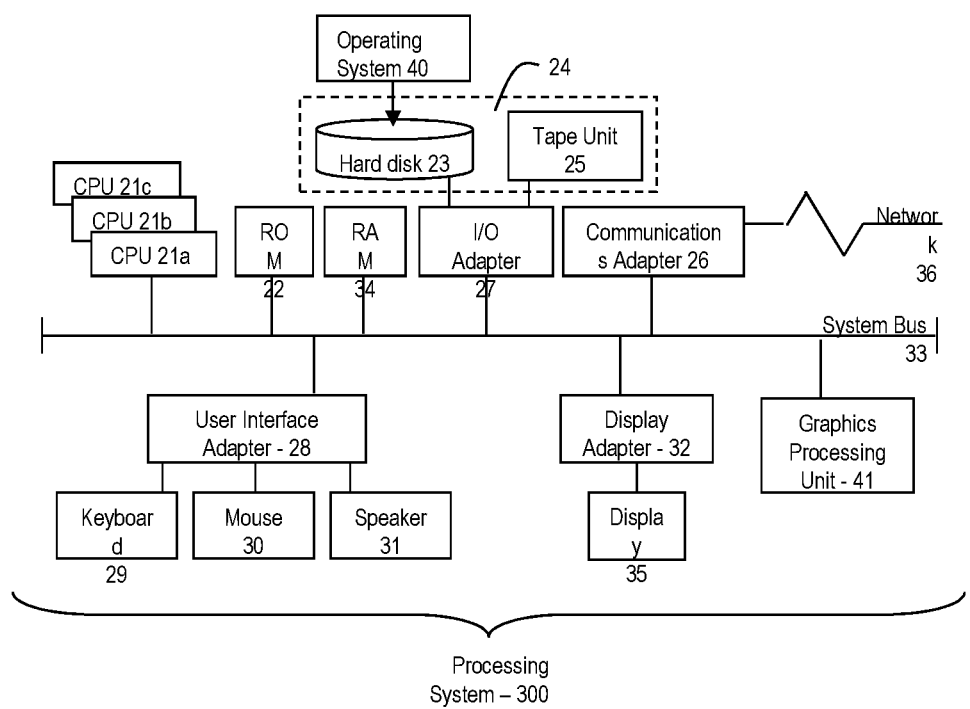
FIG. 3 depicts a block diagram of a computer system for use in implementing one or more embodiments of the present disclosure.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

Figure 4:
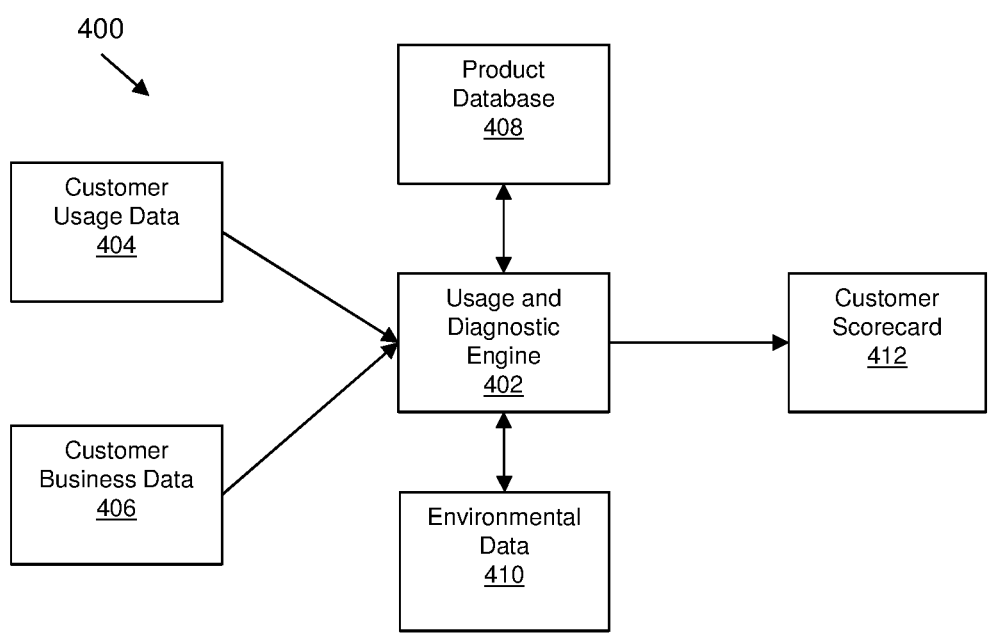
FIG. 4 depicts a system for product usage diagnostic and recommendation according to one or more embodiments of the present disclosure.

Turning now to a more detailed description of aspects of the disclosure, FIG. 4 depicts a system for usage diagnostic and recommendations for a customer product according to one or more embodiments. The system 400 includes a usage and diagnostic engine 402. The system 400 includes customer usage data 404 and customer business data 406. The customer usage data 404 is associated with one or more products the customer operates in their business such as, for example, a transport refrigeration unit. The customer business data 406 can be obtained from a customer directly or mined from data sources such as customer website, etc. The customer business data 406 can include information related to operations for a TRU such as typical hauling distances (short v. long), regions where the customer operates, and the like.

In one or more embodiments, the customer usage data 404 can be collected from a variety of sources. In some embodiments, the customer usage data 404 can be obtained from the customer directly through the use of a survey asking about the customer's practices related to the product. The survey can be paper or be entered into an online portal by the customer. The different fields of the survey can include product information such as model number, type, etc. Also, the fields can include contents being shipped using the TRUs such as perishable, non-perishable, or other types of contents. In addition, the customer business data 406 can be obtained through similar surveys that ask questions regarding typical hauling distances for TRUs, number of daily deliveries (i.e., how many times a day is the TRU door opened collected by a door switch or door opening sensor), number of TRUs in a customer fleet, and the like. Based on the customer usage data 404 and the customer business data 406, the usage and diagnostic engine 402 can generate a customer scorecard 412 for the customer which can outline information such as, for example, energy efficiency, operational efficiency, suggested actions, best practices, and one or more ratings on the usage of the customer product (e.g., TRU). In one or more embodiments, the scorecard 412 can also include recommendations or suggestions for different models of TRU components that might be more efficient or a better fit for the customer business operations.

In one or more embodiments, the system 400 through the usage and diagnostic engine 402 analyzes the customer usage data 404 along with the customer business data 406, product database 408 data, and the environmental data 410 to determine a customer scorecard 412. The customer scorecard 412 provides a snap shot of the customer's usage of the product to determine whether the customer is utilizing the product in the best possible manner. In addition, the scorecard 412 can include suggested actions for the customer to better utilize the product. For example, if the customer usage data 404 suggests that the customer is not adjusting the thermostat in the TRU as the customer progresses through a long haul transport, the scorecard 412 can recommend and suggest actions for adjusting the thermostat within the TRU as the long-haul transport enters and exits certain regions along the haul or in anticipation of entering certain weather, traffic, or other environmental conditions.

In one or more embodiments, the system 400 includes a product database 408. The product database 408 includes data for usage and tests for customer products. In addition, product best practices are also included in the product database 408. For example, in a refrigeration system, certain practices can serve to increase the lifetime and the performance of the product. In addition, the product database 408 includes information related to product usage under certain environmental conditions. The environmental conditions can be derived from environmental data 410 collected by the usage and diagnostic engine 402. In one or more embodiments, the customer usage data 404 can be obtained by sensors associated with a TRU including the thermostat operating in the TRU. The sensors can obtain conditions such as run-time operation of the TRU, how many times a compressor is engaged, how often a TRU outside door is opened, and the like. In addition, sensors can be utilized for determine outside air temperature, location data, humidity, etc. The usage and diagnostic engine 402 can be receive sensor data or other data from other sources to determine environmental conditions related to the product such as, for example, location data, weather data, traffic data, road conditions data, time of day data, and the like. A global positioning sensor (GPS) sensor can be utilized to determine location of the product and be compared to a weather application to derive environmental conditions. In one or more embodiments, a door sensor can be utilized to determine the frequency and duration a TRU door is opened.

In one or more embodiments, the system 400 can determine suggested actions or can operate to take action for the TRU based on the customer usage data 404, product data, and environmental data 410. For example, a thermostat in the TRU can determine an outside air temperature and humidity as environmental conditions for the TRU. In some embodiments, the usage and diagnostic engine 402 can also look to the customer usage data 404 and customer business data 406 to determine that the TRU has an upcoming stop that might require the TRU outside door to be opened. In anticipation of the door opening and based on the outside air temperature and humidity, the usage and diagnostic engine 402 can adjust a parameter of the thermostat in the TRU. For example, the internal temperature of the TRU is expected to rise when the outside door is opened. To anticipate this, the thermostat temperature can be adjusted downward prior to the opening so as to not allow the internal air temperature to rise above any content requirements for the TRU (e.g., perishable goods). Any adjustments to the components of the TRU can be included on the customer scorecard 412 to assist with promoting best practices for the customer.

In one or more embodiments, the customer usage data 404 can be utilized to predict needed maintenance actions for a customer for the TRU. This maintenance suggestion can be included in the customer scorecard 412. In anticipation of the needed maintenance, the usage and diagnostic engine 402 can order certain parts needed for maintenance of the TRU. For example, if a component of the TRU is nearing its service life, the usage and diagnostic engine 402 can order the component and include a suggestion to replace the component on the scorecard 412.

In one or more embodiments, the customer score card 412 can be displayed to customer through a web portal or through a display screen local to the TRU, for example. In addition, the customer survey can be provided to the customer through a web portal, paper survey, and/or a display local to the TRU.

In one or more embodiments, the usage and diagnostic engine 402 can be located on a controller within a TRU or can be on a cloud network connected to the TRU through a wireless or cellular network. In one or more embodiments, the usage and diagnostic engine 402 can be implemented on the processing system 300 found in FIG. 3. Additionally, a network can be utilized for electronic communication between and among the usage and diagnostic engine 402 and other devices. The network can be in wired or wireless electronic communication with one or all of the elements of the system 400. Cloud computing can supplement, support or replace some or all of the functionality of the elements of the system 400. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

Figure 5:
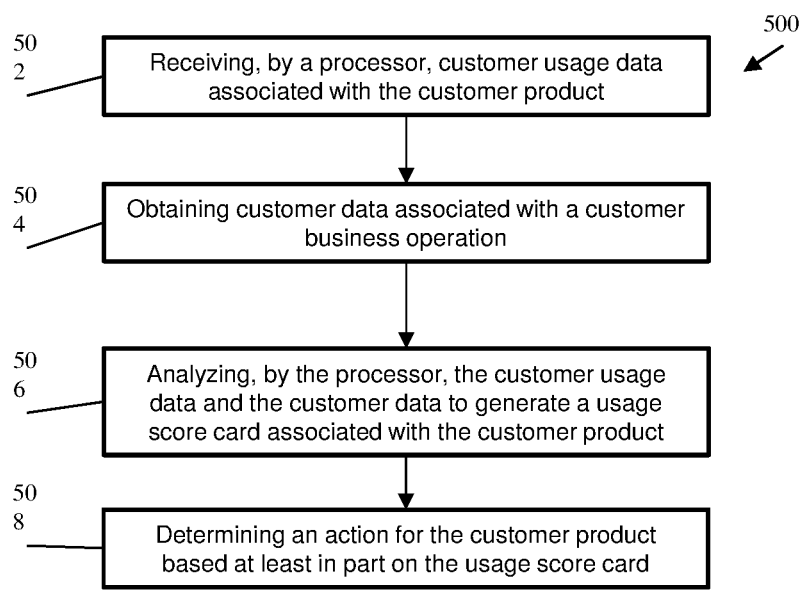
FIG. 5 depicts a method for product usage diagnostic and recommendation according to one or more embodiments of the present disclosure.

FIG. 5 depicts a flow diagram of a method for evaluation and diagnostic for a customer product according to one or more embodiments of the invention. The method 500 includes receiving, by a processor, customer usage data associated with the customer product, as shown at block 502. At block 504, the method 500 includes obtaining customer data associated with a customer business operation. The method 500, at block 506, includes analyzing, by the processor, the customer usage data and the customer data and generating a usage score card associated with the customer product. And at block 508, the method 500 includes determining an action for the customer product based at least in part on the usage score card.

Additional processes may also be included. It should be understood that the processes depicted in FIG. 5 represent illustrations, and that other processes may be added or existing processes may be removed, modified, or rearranged without departing from the scope and spirit of the present disclosure.

A detailed description of one or more embodiments of the disclosed apparatus are presented herein by way of exemplification and not limitation with reference to the Figures.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A computer-implemented method for evaluation and diagnostics of a transport refrigeration unit, the method comprising:
   receiving, by a processor, customer usage data associated with the transport refrigeration unit;
   obtaining customer business data associated with a customer business operation, wherein the customer business data is obtained using sensors associated with the transport refrigeration unit, and wherein the sensors comprise a thermostat for the transport refrigeration unit and a door sensor associated with an outside door of the transport refrigeration unit;
   obtaining environmental data associated with the transport refrigeration unit, including obtaining outside air temperature and outside air humidity;
   determining an action for the transport refrigeration unit based at least in part on the customer usage data and customer business data, wherein the action comprises adjustment of a temperature of the thermostat downward in response to the transport refrigeration unit having an upcoming stop, outside air temperature and outside air humidity;
   operating a component of the transport refrigeration unit to implement the action for the transport refrigeration unit.

2. The computer-implemented method of claim 1, further comprising:
   analyzing, by the processor, the customer usage data and the customer business data to generate a usage score card associated with the transport refrigeration unit.

3. The computer-implemented method of claim 2, further comprising displaying, on a display, the action and the usage score card.

4. The computer-implemented method of claim 1, wherein the customer usage data is obtained through a customer survey.

5. The computer-implemented method of claim 1, wherein the action comprises a suggested maintenance action for the customer product.

6. A system for evaluation and diagnostics of a transport refrigeration unit, the system comprising:

a processor communicatively coupled to a memory, the processor configured to perform the method of claim 1.

7. The system of claim 6, further comprising:

analyzing, by the processor, the customer usage data and the customer business data to generate a usage score card associated with the transport refrigeration unit.

8. The system of claim 6, further comprising:

displaying, on a display, the usage score card.

9. The system of claim 6, wherein the customer usage data is obtained through a customer survey.

10. The system of claim 6, wherein the action comprises a suggested maintenance action for the transport refrigeration unit.

\* \* \* \* \*